Patented Apr. 11, 1950

2,503,692

UNITED STATES PATENT OFFICE 2,503,692

PREPARATION OF TITANIUM DIOXIDE PIGMENTS

Charles A. Tanner, Jr., Collingswood, N. J., assignor to American Cyanamid Company, New York, N. Y., a corporation of Maine No Drawing. Application May 31, 1946, Serial No. 673,606

5 Claims. (Cl. 23—202)

This invention relates to the preparation of titanium dioxide pigment, and relates more particularly to the provision of a nucleating agent for hydrolyzing titanium salt solutions to obtain hydrous titanium oxide in noncrystalline form from which the hydrous oxide may be converted by calcination treatment to either rutile or anatase crystal structure.

Titanium dioxide, within recent years, has become widely accepted as the outstanding white pigment material used in the coating and allied industries. This popularity is due mainly to its whiteness, stability, hiding power, higher tinting strength, and ready dispersibility in a variety of vehicles. It is prepared mainly by the hydrolysis, under carefully controlled conditions, of titanium sulfate solutions containing iron, prepared by digestion of titanium-bearing ores with sulfuric acid, followed by reduction of all ferric iron to ferrous iron, removal of a part of the iron by crystallization as ferrous sulfate, clarification and adjustment of concentration. The hydrolysate is calcined, in the presence of various conditioning agents, to produce the desired white pigment.

The hydrolysis treatment is carried out on the liquors obtained from the sulfuric acid digestion of titanium-bearing ores, after the liquors have been subjected to the various clarification treatments referred to above. These liquors, ordinarily containing from about 12% to about 15% titanium dioxide, may be employed in the method of the present invention as they are received from the clarification treatment, thus providing a decided advantage over the methods of prior procedure.

It is a principal object of the present invention to provide a method of hydrolyzing titanium sulfate solutions in a relatively inexpensive manner. A further object of the invention resides in the provision of hydrous titanium oxides of optimum particle size and of a desirable texture. Another object of the invention is the production of hydrolyzed titanium dioxide of noncrystalline structure which may be easily converted to either anatase or rutile form by ordinary calcination methods. Additional objects of the invention will become apparent to those skilled in the art from the following detailed description.

Copending application, Serial No. 429,118, of L. E. Ross and C. A. Tanner, Jr., now Patent No. 2,494,492, describes a method for the preparation of a calcination seed material which is especially adapted for converting hydrous titanium dioxide, obtained by the hydrolysis of titanium sulfate solutions, to titanium dioxide having rutile crystal structure. This rutile calcination seed is prepared by treating an alkali metal titanate with certain definite quantities of a monobasic acid such as hydrochloric acid. The alkali metal titanate is prepared by heating an aqueous pulp of substantially pure hydrated titanium dioxide, containing a small amount of combined and/or adsorbed sulfuric acid, obtained by thermal hydrolysis of a titanium sulfate solution, with an excess of an alkali metal hydroxide solution for a period of time ranging from about 1 hour to about 6 hours. The alkali metal titanate so formed is washed to remove excess alkali and is subsequently boiled in the presence of an amount of monobasic acid which is in sufficient excess over the amount required to neutralize the alkali metal present to yield from about 20% to about 50% of theoretical for the formation of the normal tetra-salt of the monobasic acid.

The seed so produced is not a nucleating agent for hydrolyzing titanium sulfate solutions since it does not accelerate the precipitation of hydrous titanium oxide when introduced into a titanium sulfate liquor prior to hydroylsis, but is carried through as an inert material.

My copending application, Serial No. 673,607, filed on even date herewith, describes a method for the preparation of a titanium sulfate hydrolysis nucleating agent wherein an alkali metal titanate prepared as described above according to copending application, Serial No. 429,118, is treated with hydrochloric acid to neutralize the combined alkali metal, but terminating the acid treatment short of conversion of any of the hydrated titanium dioxide to titanium tetrachloride.

The present invention is based on the discovery that the alkali metal titanate produced according to the method of the above identified application is an extremely effective titanium sulfate hydrolysis nucleating agent. This titanate differs materially from alkali metal titanates produced by other methods in that the reaction between the titanium sulfate hydrolysate and the alkaline alkali metal compound is carried out in an aqueous medium under relatively mild conditions. The temperatures employed are not in substantial excess of 100° C., and are usually within the range of from about 85° C. to about 95° C., which are insufficient for the production of any crystalline alkali metal titanate. The alkali metal titanate of the present invention has been shown by microscopic and X-ray diffraction analysis to have no definite pattern of crystalline structure.

The improved nucleating agent of the present invention is prepared from a conventional titanium sulfate hydrolysate. Although the exact composition of this hydrolysate is not known, it is believed that its composition is best described by the formula: $10TiO_2 \cdot 10H_2O \cdot xSO_3$. Upon heating this material with, for example, sodium hydroxide solution for a period of time of from 1 to 6 hours, a water insoluble product is obtained which, after removal of excess alkali, contains from about 80% to about 86% $TiO_2$ and from about 20% to about 14% $Na_2O$ by analysis, depending on the time of boiling. These analyses correspond to the compounds $Na_2Ti_5O_{11}$ and $Na_2Ti_3O_7$, respectively.

The nucleating agent of this invention differs very decidedly in its nucleating action from previous hydrated titanium dioxides which have been used as hydrolysis nucleating agents for titanium sulfate solutions. One advantageous difference of the present invention resides in the fact that my novel nucleating agent, upon addition to titanium sulfate solutions at relatively elevated temperatures, is very rapidly transformed to colloidal $TiO_2$. Thus, the entire amount of $TiO_2$ nuclei formed is present in the solution at the beginning of the hydrolysis treatment and is available at the time when the titanium sulfate has become sufficiently hydrolyzed so that $TiO_2$ is formed. This freshly formed $TiO_2$ adheres to the individual nuclei and is subsequently precipitated in uniform size. The nuclei of this invention are very stable and of uniform characteristics, remaining unchanged after storage for several months at room temperature. Heretofore, according to prior procedures, the formation of nuclei was a continuing process in which the difficulties of controlling the formation of the desired quantity of properly aged nuclei often resulted in non-uniform products. When too few nuclei were present, the titanium dioxide built up on the few nuclei, resulting in a low yield, and forming a hydrolysate of large particles which overburned on calcination before optimum pigment properties were attained. On the other hand, where excess nuclei were present precipitation was too rapid, resulting in the depletion of the titanium dioxide content of the titanium sulfate solution and preventing proper particle growth. The hydrolysate obtained was difficult to filter and purify, and resulted in a hard, sintered calcination product of extremely poor texture and color.

A further advantage resulting from the use of my novel nucleating agent resides in the fact that titanium sulfate solutions containing from about 12% to about 16% $TiO_2$, which represents the normal concentration of titanium sulfate liquors obtained from the clarification process, may be satisfactorily hydrolyzed. Formerly it has been the practice to increase the concentration of $TiO_2$ content of the titanium sulfate solutions to at least 16%, thus necessitating expensive vacuum evaporation treatment.

It has been found that titanium sulfate solutions of widely varying acidity may be satisfactorily employed. However, optimum results have been obtained when employing titanium sulfate solutions having a Basicity Factor of from about 25 to about 30, wherein basicity represents the per cent of acid lacking to form the theoretical titanium sulfate of the formula $Ti(SO_4)_2$. Hydrolysis treatment accorded these preferred solutions results in the formation of hydrous titanium oxide particles of desirably uniform size.

The hydrolysis treatment is carried out by mixing an aqueous dispersion of the nucleating agent at about 20% solids content with the titanium sulfate liquor at a temperature of about 50° C. If desired the mixing procedure may be reversed and the titanium sulfate liquor may be added to an aqueous slurry of the nucleating agent. The mixture is then heated to boiling and is boiled for a period of from about 1 to about 5 hours. It has been found that the addition of water during the boiling period, to maintain the desired acid concentration, increases the rate of hydrolysis so that precipitation of substantially all of the $TiO_2$ present in the titanium sulfate solution may be accomplished in about 2 to 3 hours. If desired, the heating period may be further shortened by carrying out the hydrolysis treatment in an autoclave under increased temperature and pressure. Although a temperature of about 50° C. has been indicated as being convenient during the addition of the nucleating agent to the titanium sulfate solution, the liquor may be heated to any temperature desired, as from room temperature to about 100° C. or even higher if an autoclave is used. The amount of nucleating agent which is employed in the method of the present invention may vary from about 0.5% to about 6% based on the amount of $TiO_2$ present in the titanium sulfate solution, the addition of about 3% of the nucleating agent having been found to produce hydrous titanium oxide having a particle size which permits optimum calcination results.

In order that the invention may be more readily understood, the following specific examples are given. It will be understood, however, that the examples are primarily for the purpose of illustration, the scope of the invention being defined by the appended claims.

*Example 1*

To an aqueous pulp of substantially pure hydrated titanium dioxide, containing a small amount of combined and/or adsorbed sulfuric acid, obtained by hydrolytic precipitation from titanium sulfate solution and containing 100 g. of titanium dioxide at about 30% solids content, was added 150 g. of sodium hydroxide while stirring continuously. The mixture was heated for about 2 hours at a temperature of about 85° C. to 90° C., the mixture being maintained at a constant volume. The titanate thus formed was diluted with water, filtered, and washed substantially free of sulfates and excess alkali.

*Example 2*

To 3000 g. of titanium sulfate liquor, containing 15.1% $TiO_2$, was added, at 50° C., 15.1 g. of the nucleating agent of Example 1, containing the equivalent of 2.26 g. of $TiO_2$ (0.5%). The mixture was heated and boiled for one hour. Over a period of 30 minutes 460 cc. of water was added, and the mixture was boiled for an additional 1½ hours. The yield of hydrous titanium oxide was 83.6%. The product was treated with rutile seed and was calcined to rutile titanium dioxide pigment having very good color characteristics and a tinting strength of 1620.

*Example 3*

The procedure employed was the same as that of Example 2 except that 3% of nucleating agent was added to the liquor. The $TiO_2$ yield was 94%. The product obtained was calcined to rutile titanium dioxide pigment and had good color characteristics and a tinting strength of 1590.

Example 4

The procedure employed was the same as that of Example 2 except that 6% nucleating agent was added. The yield of $TiO_2$ was 96%. The product was calcined to rutile $TiO_2$ pigment and had good color characteristics and a tinting strength of 1610.

Example 5

88 g. of an aqueous slurry of the nucleating agent of Example 1, containing the equivalent of 13.5 g. (3%) of $TiO_2$, was diluted with 120 cc. of water. This nuclei mixture was then heated to 90° C. and to this was added 2660 g. of titanium sulfate liquor, also at 90° C. containing the equivalent of 450 g. of $TiO_2$. The titanium sulfate liquor was added at a constant rate over a period of 8 minutes. The mixture was boiled for a total of 3 hours. Addition of hot water was started after precipitation occurred and was continued over a period of 30 minutes, the water being added at a constant rate. The $TiO_2$ yield was 96.9%. The product was calcined to rutile titanium dioxide pigment and had very good color characteristics and a tinting strength of 1630.

Example 6

To 3040 g. of titanium sulfate liquor containing 14.9% $TiO_2$, was added 83.2 g. of the nucleating agent of Example 1 containing the equivalent of 13.5 g. (3%) of $TiO_2$. The mixture was boiled for 5 hours under reflux. Water was added to the mixture at a constant rate over a period of 3½ hours, the amount of water added being calculated to give a free $H_2SO_4$ content of 22.8% at the end of hydrolysis. The yield of $TiO_2$ was 92.9%. The product was calcined to anatase titanium dioxide pigment and had good color characteristics and a tinting strength of 1210.

What I claim is:

1. In a process for preparing titanium dioxide, the step which comprises hydrolyzing an aqueous solution of a titanium sulfate solution containing from about 12% to about 16% titanium dioxide in the presence of a small amount of an alkali metal titanate, said alkali metal titanate having been prepared by boiling an aqueous slurry of a purified titanium sulfate hydrolysate in the presence of an alkali metal hydroxide for from about 1 to about 6 hours, filtering the mixture, and washing the excess alkali from the residue.

2. In a process for preparing titanium dioxide, the step which comprises hydrolyzing a mixture of a titanium sulfate solution containing from about 12% to about 16% titanium dioxide and an alkali metal titanate containing the equivalent of from about 0.5% to about 6% $TiO_2$, based on the titanium dioxide present in the titanium sulfate solution, said alkali metal titanate having been prepared by boiling an aqueous slurry of a purified titanium sulfate hydrolysate in the presence of an alkali metal hydroxide for from about 1 to about 6 hours, filtering the mixture, and washing the excess alkali from the residue.

3. A process for preparing hydrous titanium oxide which comprises the steps of mixing a titanium sulfate solution, containing from about 12% to about 16% titanium dioxide, at a temperature of from about 20° C. to about 100° C., and a small amount of an alkali metal titanate, said alkali metal titanate having been prepared by boiling an aqueous slurry of a purified titanium sulfate hydrolysate in the presence of an alkali metal hydroxide for from about 1 to about 6 hours, filtering the mixture, washing the excess alkali from the residue, and boiling the mixture for about 3 to 5 hours.

4. A process for preparing hydrous titanium oxide which comprises the steps of mixing a titanium sulfate solution, containing from about 12% to about 16% titanium dioxide and having a basicity factor of from about 25 to about 30, at a temperature of from about 20° C. to about 100° C., and a small amount of an alkali metal titanate, said alkali metal titanate having been prepared by boiling an aqueous slurry of a purified titanium sulfate hydrolysate in the presence of an alkali metal hydroxide for from about 1 to about 6 hours, filtering the mixture, and washing the excess alkali from the residue, and boiling the mixture for about 3 to about 5 hours.

5. A process for preparing hydrous titanium oxide which comprises the steps of mixing a titanium sulfate solution, containing from about 12% to about 16% titanium dioxide and having a basicity factor of from about 25 to about 30, at a temperature of from about 20° C. to about 100° C., and an alkali metal titanate containing the equivalent of from about 0.5% to about 6% $TiO_2$ based on the titanium dioxide content of the titanium sulfate solution, said alkali metal titanate having been prepared by boiling an aqueous slurry of a purified titanium sulfate hydrolysate in the presence of an alkali metal hydroxide for from about 1 to about 6 hours, filtering the mixture, washing the excess alkali from the residue, and boiling the mixture for about 3 to about 5 hours.

CHARLES A. TANNER, Jr.

REFERENCES CITED

The following references are of record in the file of this patent:

UNITED STATES PATENTS

| Number | Name | Date |
|---|---|---|
| 1,947,226 | Richter | Feb. 13, 1934 |
| 2,029,881 | Little | Feb. 4, 1936 |
| 2,078,279 | Richter | Apr. 27, 1937 |
| 2,389,026 | Cauwenburg | Nov. 13, 1945 |